Aug. 13, 1968  J. H. AUER, JR  3,397,304
METHOD AND APPARATUS FOR MEASURING VEHICULAR TRAFFIC
Filed Aug. 29, 1963
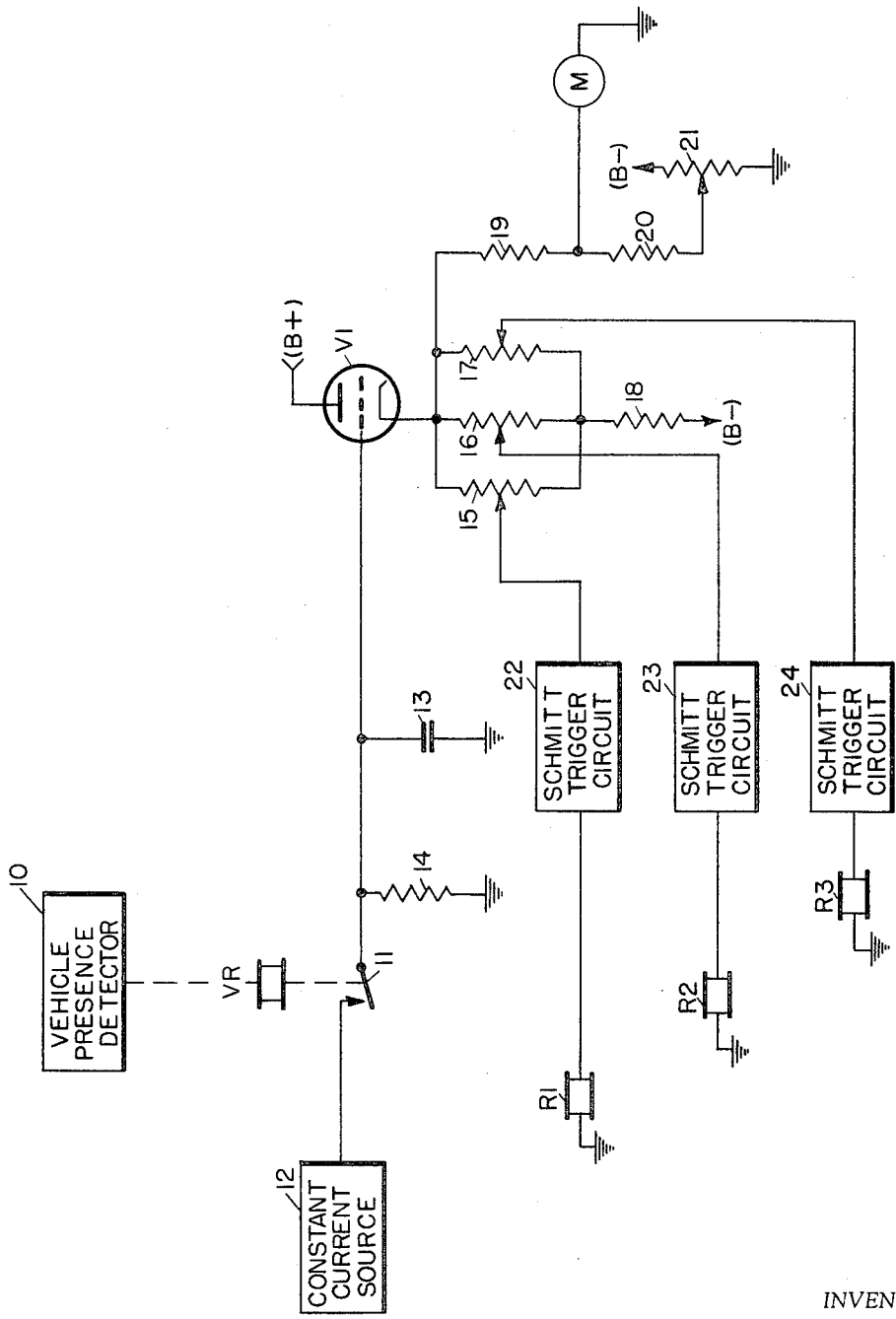
INVENTOR.
J. H. AUER JR.
BY
Forest B. Hitchcock
HIS ATTORNEY

United States Patent Office 3,397,304
Patented Aug. 13, 1968

3,397,304
METHOD AND APPARATUS FOR MEASURING VEHICULAR TRAFFIC
John H. Auer, Jr., Rochester, N.Y., assignor to The General Signal Corporation, Rochester, N.Y., a corporation of New York
Filed Aug. 29, 1963, Ser. No. 305,469
7 Claims. (Cl. 235—150.24)

ABSTRACT OF THE DISCLOSURE

The disclosure relates to apparatus for measuring the traffic parameter of lane occupancy, i.e. percentage of pavement which is vehicle-occupied. A vehicle presence detector controls the addition of signal, at a constant rate, to a signal accumulating means throughout each vehicle detection interval; at the same time, signal is being subtracted continually from the signal accumulating means at a rate proportional to the present value of the signal stored in the signal accumulating means. The magnitude of the stored signal at each moment represents lane occupancy.

---

The prior art discloses both methods and apparatus for measuring several quite different traffic parameters, and also discloses the use of these parameters in the control of traffic signals and in traffic surveillance systems. More specifically, the prior art discloses the measurement of traffic volume which is a measure of the number of vehicles passing a given point on a highway in unit time. One severe disadvantage of the traffic volume parameter is its failure to take into account vehicle speed with the result that this parameter may be ambiguous in respect to the information provided since the same volume level may exist both at low and high levels of traffic congestion. Recognizing this disadvantage, there has been developed apparatus which instead measures what is termed traffic "density," i.e., the number of vehicles per unit distance along the highway. Traffic density is a much more accurate representation of traffic congestion since it is affected not only by the number of vehicles passing a monitoring location in unit time, but also by the speeds of such vehicles.

Nevertheless, even the improved traffic parameter of traffic density has its shortcomings. One of these is the difficulty which has existed in measuring density. One common way in which this is done is to determine separately traffic volume and vehicle speed at a given monitoring location and then divide these two parameters, with the quotient being representative of traffic density. This requires that the vehicle detectors used be capable of measuring vehicle speed which often is a disadvantage since vehicle speed detectors are ordinarily more complex and more costly than detectors which merely sense the passage or presence of vehicles. Another disadvantage lies in the need to provide equipment capable of effecting division of the vehicle volume and vehicle speed parameters since apparatus which can carry out this computing function is fairly complex.

Still another disadvantage arises when it is desired that the computing functions involved in the determination of density for a relatively large number of detector locations all be carried out at one central location. In this event, it becomes necessary to telemeter vehicle speed signals from each detector location to the central location, and since the vehicle speed signals are ordinarily in the form of a Doppler beat frequency whose frequency value is dependent upon vehicle speed, a quite uneconomical use of line or radio circuits is involved since a separate channel must ordinarily be provided for each of the remote detectors and each such channel must have an appreciable band-width to carry the alternating-current Doppler signal.

Moreover, the traffic density parameter has the disadvantage that it fails to take into account the variable length of vehicles. This can be more readily appreciated when it is recognized that any given value of traffic density (vehicles per mile) may represent quite different amounts of actual traffic congestion depending upon whether the vehicles constituting the traffic stream comprise a relatively large percentage of long vehicles such as trucks and buses, or a very minute or zero percentage of such vehicles. Obviously, a given traffic density value may represent a high degree of traffic congestion where the traffic concerned is made up to an appreciable degree of long vehicles such as trailor-trucks; whereas, it may represent a considerably lower amount of traffic congestion when the traffic comprises mostly passenger vehicles.

In recognition of these various problems, I have devised methods and apparatus for measurement of a traffic congestion parameter which overcomes all of these difficulties. This traffic parameter is termed "lane occupancy" and is a parameter whose value is proportional to the percentage of pavement occupied. One immediate advantage of such a parameter is that it automatically takes into account the particular nature of the traffic stream since, for the same number of vehicles per unit distance of highway, lane occupancy may assume different values in dependence upon the average length of the vehicles constituting the stream. Another advantage is that this parameter can be derived from a simple presence-type vehicle detector with no need to measure vehicle speed. This latter advantage results in a still further advantageous feature in that the vehicle presence detector information from a large number of vehicle detectors may be telemetered to a central location with an extremely economical use of communication circuits since the signal transmitted from any one detector need only comprise a pulse whose duration is proportional for each vehicle detected to the length of time required for the vehicle to pass a given point which is normally the detection zone associated with the presence detector.

In the prior co-pending application of H. C. Kendall and J. H. Auer, Jr., Ser. No. 78,410, filed Dec. 27, 1960, now Patent No. 3,233,084, issued Feb. 1, 1966, there is disclosed a method and apparatus for measuring lane occupancy through the use of a presence-type vehicle detector. In such prior application, there is disclosed apparatus which comprises a signal accumulating means for continually storing a manifestation of the current value of lane occupancy. In the specific embodiment disclosed, the signal accumulating means comprises a storage capacitor, and an associated circuit adds to the stored manifestation in response to each vehicle detected at a rate proportional to the difference between then-existing stored value and some predetermined higher reference value and over the vehicle presence interval demarcated by the respective detector; at all other times, the accumulated lane occupancy manifestation is reduced at a rate proportional to its present value. As is mathematically explained in this prior application, the result of these operations is to provide a manifestation in the signal accumulator means whose value is representative of lane occupancy, i.e., percentage of pavement occupied.

Described briefly, the present invention may be considered as an improvement over that disclosed in Patent No. 3,233,084. My present invention relates to method and apparatus for determining lane occupancy in response to vehicle detections by a presence-type detector through the use of a different circuit organization from that disclosed in the prior copending application. Thus, I have found that the lane occupancy parameter may alternatively be measured by providing again a signal accumulating means such as a capacitor, adding to the manifestation stored in the accumulating means at a constant rate throughout each vehicle presence interval demarcated by the vehicle detector, while simultaneously reducing the accumulated manifestation at all times at a rate proportional to the existing value of said manifestation.

As one specific embodiment of means for carrying out this invention, I have disclosed herein a signal accumulating means which comprises a capacitor, an associated circuit which adds electrical charge to the capacitor at a constant rate throughout each vehicle presence interval demarcated by the presence-type vehicle detector, and another associated circuit which permits the capacitor to discharge continually through a shunt resistance.

Accordingly, an object of this invention is to provide an improved method and apparatus for measuring vehicle lane occupancy.

The accompanying drawing illustrates one possible embodiment for means for practicing my invention.

In the drawing, a vehicle presence detector 10 is shown which controls the operation of a vehicle relay VR. The detector 10 may be any of numerous types of presence-type detectors, and may be a so-called radar-type detector, loop detector, photocell detector, or may be of the sonic type, as shown, for example, in the Kendall et al. Patent No. 3,042,303. The common characteristic of such detectors is that they demarcate, in response to each vehicle passing through a detection zone associated with the detector, an interval whose length is substantially proportional to the length of time required for the vehicle to pass through said detection zone. Thus, detector 10 controls an associated vehicle relay VR in such a manner that this normally deenergized relay is picked up throughout the time required for each vehicle to pass through a detection zone demarcated by detector 10.

The vehicle relay VR has a contact 11 which, when closed, connects a constant current source 12 to the upper terminal of a storage capacitor 13. Under normal conditions, when no vehicle is being detected by detector 10, relay VR is dropped away, its front contact 11 is open, and constant current source 12 is disconnected from capacitor 13. However, when a vehicle is detected, relay VR picks up to close its front contact 11, and an increment of electric charge is added to that already stored in capacitor 13. Because of the characteristic of source 12, the charging takes place at a constant rate throughout the closure time of contact 11 despite the fact that capacitor 13 may be charged to different voltage levels at different times. Capacitor 13 is shunted by a resistor 14 at all times with the result that capacitor 13 continually discharges through resistor 14, with the rate of discharge being proportional to the current value of voltage across capacitor 13.

The voltage at the upper terminal of capacitor 13 is applied to the control grid of cathode follower tube V1. Tube V1 conducts an amount of plate-cathode current which is dependent upon its grid-cathode voltage, and this determines the amplitude of its cathode potential. As shown, the voltage at the cathode is applied through a resistor 19 and resistor 20 to the variable path of potentiometer 21 which is connected between (B—) and ground. The junction of resistor 19 and 20 is connected through a meter M to ground. Consequently, meter M provides a measure of the voltage at the junction of resistors 19 and 20, and its voltage reading is thus proportional to the cathode voltage of V1 and also to the voltage appearing across capacitor 13. Meter M thus provides a measure of lane occupancy as will be shown and its scale may be calibrated to read from zero to one hundred percent. The reason for connecting a terminal of the meter to the junction of resistors 19 and 20, with the lower terminal of resistor 20 connected to a source of negative voltage at the top potentiometer 21, is to counteract the action of the cathode follower circuit in providing a cathode voltage which is slightly more positive than the grid voltage. The apparatus may be properly calibrated by adjusting the tap of potentiometer 21 so that meter M will read zero percent when there is zero voltage across capacitor 13.

Included in the cathode circuit of tube V1 are three parallel potentiometers 15, 16 and 17. This parallel combination is connected in series with a resistor 18 whose lower terminal is connected to the (B—) source of voltage.

Each of the variable taps associated respectively with the potentiometers 15, 16 and 17 provides a different level of voltage to an associated Schmitt trigger circuit 22, 23 and 24. In each instance, of course, the voltage applied to each Schmitt trigger circuit varies in accordance with the cathode voltage of tube V1. However, by appropriate adjustment of the taps on these potentiometers 15–17, it is possible to control the several Schmitt trigger circuits 22–24 so that each will operate in response to a different value of lane occupancy. Since Schmitt trigger circuits are well known in the art, it is not deemed necessary to show or describe them in detail; in essence, each acts as a two-trigger circuit which is operable from its normal condition to an abnormal condition only if, and only for so long as its input voltage exceeds some predetermined design value. Thus, these potentiometer taps may be so set that relay R1 will only pick up for values of cathode voltage of tube V1 which are so high as to represent a value of lane occupancy in excess of some predetermined relatively high value such as 60 percent. In a similar manner, potentiometers 16 and 17 may, respectively, be so adjusted that Schmitt trigger circuits 23 and 24 will pick up for respectively lower but different values of lane occupancy. As with the circuit directly associated with the energization of meter M, a connection is provided from the lower end of each of the potentiometers 15–17 through a fixed resistance 18 to the (B—) source, and the reason for doing this is similar to that just described, i.e., to compensate for the fact that the cathode potential of tube V1 is ordinarily slightly above its grid potential.

In the prior copending application Ser. No. 78,410, now Patent No. 3,233,084, referred to previously, it is shown that a manifestation whose value is representative of the percentage detection time of a vehicle detector over a given measuring interval provides a measure of lane occupancy. I shall now show that the means disclosed herein provides a manifestation whose value is representative of the percentage detection time of an associated detector and thereby provides a measure of lane occupancy.

The explanation is facilitated by considering the condition existing when lane occupancy has reached some steady-state value. Under this condition, the amount added to the existing steady-state lane occupancy manifestation in response to each subsequent vehicle detected must equal the amount by which the value of the manifestation is decreased in the interval between successive vehicle detections. If T is the assumed measuring interval and is here limited in length to the time from one vehicle detection to the next, while $t_1$ is the measured detection time of the vehicle whose contribution to the lane occupancy manifestation is being considered, then the charge $Q_1$ acquired by capacitor 13 in time $t_1$ can be expressed by $$(1) \qquad Q_1 = \int_0^{t_1} i \, dt$$

Since the charging current is constant, $$(2) \qquad Q_2 = it_1$$

On the other hand, the amount of charge lost by capacitor 13 in the interval from one vehicle detection to the next, T, is $$(3) \qquad Q_2 = \int_0^T i \, dt$$

Assuming that the time constants involved are of sufficient length so that the discharge current does not vary appreciably during time T, then Equation 3 may be rewritten as (4) $$Q_2 = \frac{E_{AV}}{R} \cdot T$$

where $E_{AV}$ is the magnitude of voltage stored in capacitor 13 and R is the value of resistance of resistor 14. Under the assumed conditions $$Q_1 = Q_2$$

Thus, $$it_1 = \frac{E_{AV}}{R} \cdot T$$

Since R and $i$ are constants, $$E_{AV} = k\frac{t_1}{T}$$

In other words, the voltage across capacitor 13 is proportional in amplitude to the percentage detection time of detector 10 and is thus representative of lane occupancy as shown in copending application Ser. No. 78,410.

The particular embodiment shown herein uses a capacitor as the accumulating means, and the lane occupancy computing means shown is essentially an analog-type circuit. However, it is obvious to one skilled in the art that the disclosed invention could also be practiced by use of digital computer techniques or through the medium of fluid mechanics as possible examples. Moreover, it is also apparent that my invention can be practiced by hand even though this is, in practice, inconvenient; thus, one could employ only a stop watch to determine vehicle occupancy time intervals and then carry out the various computing steps previously set forth herein.

In carrying out the invention through the medium of fluid mechanics, one could, for example, provide a fluid container, add fluid thereto for each vehicle detected in an amount proportional to the time required for said vehicle to pass a given point, while constantly discharging fluid from the container at a rate proportional to the amount accumulated, as by an aperture in the bottom thereof through which fluid would flow in proportion to the head of fluid in the container.

What I claim is:
1. The method of obtaining a signal representative of highway lane occupancy which comprises the steps of:
    (a) measuring the time required for a vehicle to pass a given point on said highway;
    (b) adding, for each vehicle passing said given point, to an existing value of said signal, at a constant rate and for a time substantially equal to the time measured in step (a); and
    (c) at all times continually subtracting from the present value of said signal at a rate substantially proportional to its present value.
2. Apparatus for measuring highway lane occupancy comprising, vehicle presence detector means responsive to each vehicle travelling along said lane and demarcating a time interval proportional to the time required for each said vehicle to pass a given point, signal accumulating means, means controlled by said detector means for incrementally adding in response to each vehicle detected to the existing value of signal stored in said accumulating means at a constant rate and for a time substantially equal to the duration of said interval, means for at all times continually subtracting from the existing value of said signal stored in said accumulating means at a rate proportional to said existing value, and means responsive to the value of signal in said signal accumulating means.
3. The apparatus as in claim 2 in which said signal accumulating means comprises a capacitor and said signal is the voltage across said capacitor.
4. The apparatus of claim 3 in which said adding means includes a constant current source for charging said capacitor.
5. The apparatus of claim 4 in which said subtracting means comprises a resistor in shunt with said capacitor
6. The method of generating a signal representative of highway lane occupancy which comprises the steps of:
    (a) measuring the time required for a vehicle to pass a given point on said highway;
    (b) adding for each vehicle passing said given point to the existing value of said signal an amount proportional to the time measured in step (a);
    (c) at all times continually subtracting from said signal at a rate proportional to its existing value.
7. Apparatus for measuring highway lane occupancy comprising, vehicle presence detector means responsive to each vehicle travelling along said lane and demarcating a time interval proportional to the time required for each said vehicle to pass a given point, signal accumulating means comprising a capacitor, means controlled by said detector means for incrementally adding in response to each vehicle detected to the existing value of signal stored by the capacitor an amount whose magnitude is in proportion to said time interval, and means for at all times continually subtracting from said stored signal at a rate substantially proportional to the value of said signal.

References Cited

UNITED STATES PATENTS

| | | | |
|---|---|---|---|
| 2,374,248 | 4/1945 | Tuttle. | |
| 2,835,809 | 5/1958 | Taylor | 328—183 XR |
| 3,315,065 | 4/1967 | Auer | 235—150.24 |
| 2,999,999 | 6/1961 | Bartelink | 235—150.24 |
| 3,097,295 | 7/1963 | Williams | 235—150.24 |
| 3,109,926 | 11/1963 | Bolton | 235—150.24 |
| 3,193,798 | 7/1965 | Palmer | 340—31 |
| 3,233,084 | 2/1966 | Kendall et al. | 235—150.24 |

MALCOLM A. MORRISON, *Primary Examiner.*

W. M. JOHNSON, *Assistant Examiner.*